(No Model.)
N. GILLESPIE.
BLANKET MUZZLE.
No. 457,193. Patented Aug. 4, 1891.
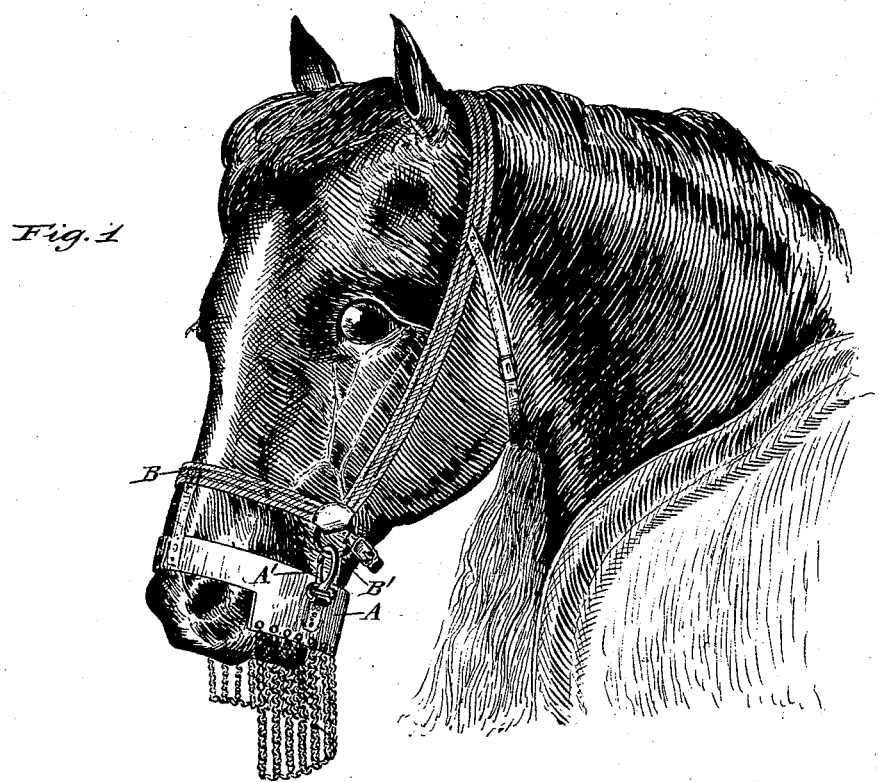
Fig. 1
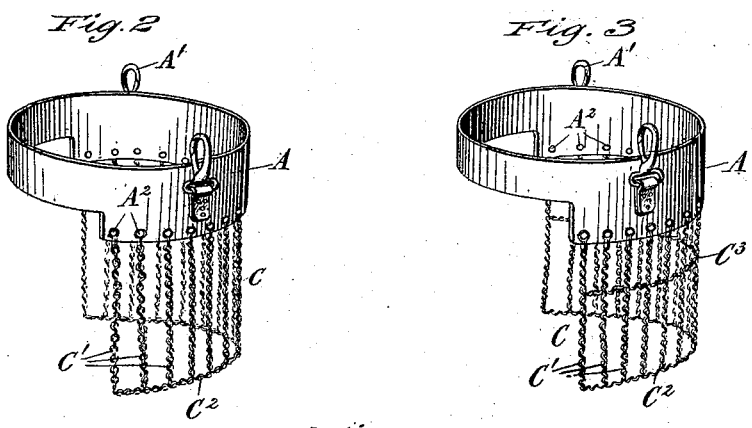
Fig. 2   Fig. 3
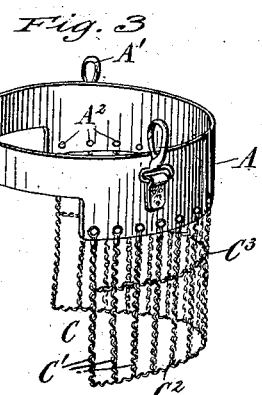
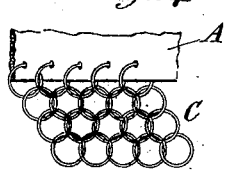
Fig. 4
WITNESSES:
Walter W. Lovegrove
John T. Booth
INVENTOR
Nelson Gillespie,
BY Geo. A. Mosher
his ATTORNEY.
THE NORRIS PETERS CO., PHOTO-LITHO., WASHINGTON, D. C.

UNITED STATES PATENT OFFICE.

NELSON GILLESPIE, OF HOOSICK FALLS, NEW YORK, ASSIGNOR OF ONE-HALF TO CHESTER GILLESPIE, OF SAME PLACE.

BLANKET-MUZZLE.

SPECIFICATION forming part of Letters Patent No. 457,193, dated August 4, 1891.

Application filed April 14, 1890. Serial No. 347,783. (No model.)

*To all whom it may concern:*

Be it known that I, NELSON GILLESPIE, a citizen of the United States, residing at Hoosick Falls, county of Rensselaer, and State of New York, have invented certain new and useful Improvements in Blanket-Muzzles, of which the following is a specification.

My invention relates to such improvements; and it consists of the novel construction and combinations of parts hereinafter described and subsequently claimed.

Reference may be had to the accompanying drawings and the letters of reference marked thereon, which form a part of this specification.

Similar letters refer to similar parts in the several figures therein.

Figure 1 of the drawings is a view in perspective of my improved muzzle in position around the mouth of a horse. Fig. 2 is a view in perspective of the muzzle detached. Fig. 3 is a similar view showing a modified form of construction. Fig. 4 is a plan view of a portion of the muzzle, showing a modified form of link apron.

It is well known to horsemen that many horses are greatly annoyed by their blankets, and seizing them with the teeth tear and pull them off, thereby exposing the horse to the inclemency of the weather and injuring the blanket.

The object of my invention is to provide a muzzle which can be easily and quickly attached to the halter in such a position that the horse cannot get the blanket within his mouth and which will not materially inconvenience him while eating.

Referring to the drawings, A is a band adapted to be slipped over the nose and mouth of the horse and fit loosely in the position shown in Fig. 1, where it is supported by the snap-hooks A', fastened to the band and attached to the headstall B by snapping the hooks into the rings B'. The muzzle-band A is provided with an apron C, pendent from the lower edge of the rear portion of the band, composed of a plurality of connected links. The apron extends below the mouth of the horse, and being flexible and hanging loosely from the band will always come between the blanket and the mouth as the horse throws his head down and backward to seize the the blanket. When the apron is formed of links, it is not only flexible but collapsible, forming a heap of links on the bottom of the manger when the horse forces his mouth down upon the manger-bottom in eating. The movements of the links one upon another tends to keep them clean and prevent the accumulation of offensive matter, such as is soon deposited upon aprons made of textile fabric, leather, or other integral material. The links may be of any known form and united in any known form or manner to produce the desired apron.

In Fig. 2 I have shown a series of chains C', each secured at its upper end to the lower edge of the band by passing the upper link through a small aperture or secured by eyelet or rivet $A^2$ therein, the lower ends of the pendent chains being united by a horizontal chain $C^2$.

In Fig. 3 the pendent chains are united at their lower ends by the chain $C^2$ and intermediately of their ends by the horizontal chain $C^3$.

In Fig. 4 I have shown the links $C^4$ round in the form of rings and interwoven with each other laterally as well as vertically.

I do not wish to be limited to any specific form of apron or band for supporting the apron, nor in the manner of securing the band upon the head of the horse.

What I claim as new, and desire to secure by Letters Patent, is—

1. As an improved article of manufacture, a blanket-muzzle consisting of a band or support provided with attaching mechanism for attaching the support to the head of a horse, and a link apron pendent from the rear portion of such support and adapted to extend below the mouth of the horse when in use, substantially as described.

2. In a blanket-muzzle, the combination, with a nose-band and detachable connections on such band for connecting the band with a headstall, of an apron pendent from the rear portion of such band and adapted to extend below the mouth of the horse when in use, such apron being composed of a plurality of interconnected links, substantially as described.

In testimony whereof I have hereunto set my hand this 12th day of April, 1890.

NELSON GILLESPIE.

Witnesses:
HARRY W. REXTREW,
JOHN P. DONOHUE.